United States Patent Office 3,473,846
Patented Oct. 21, 1969

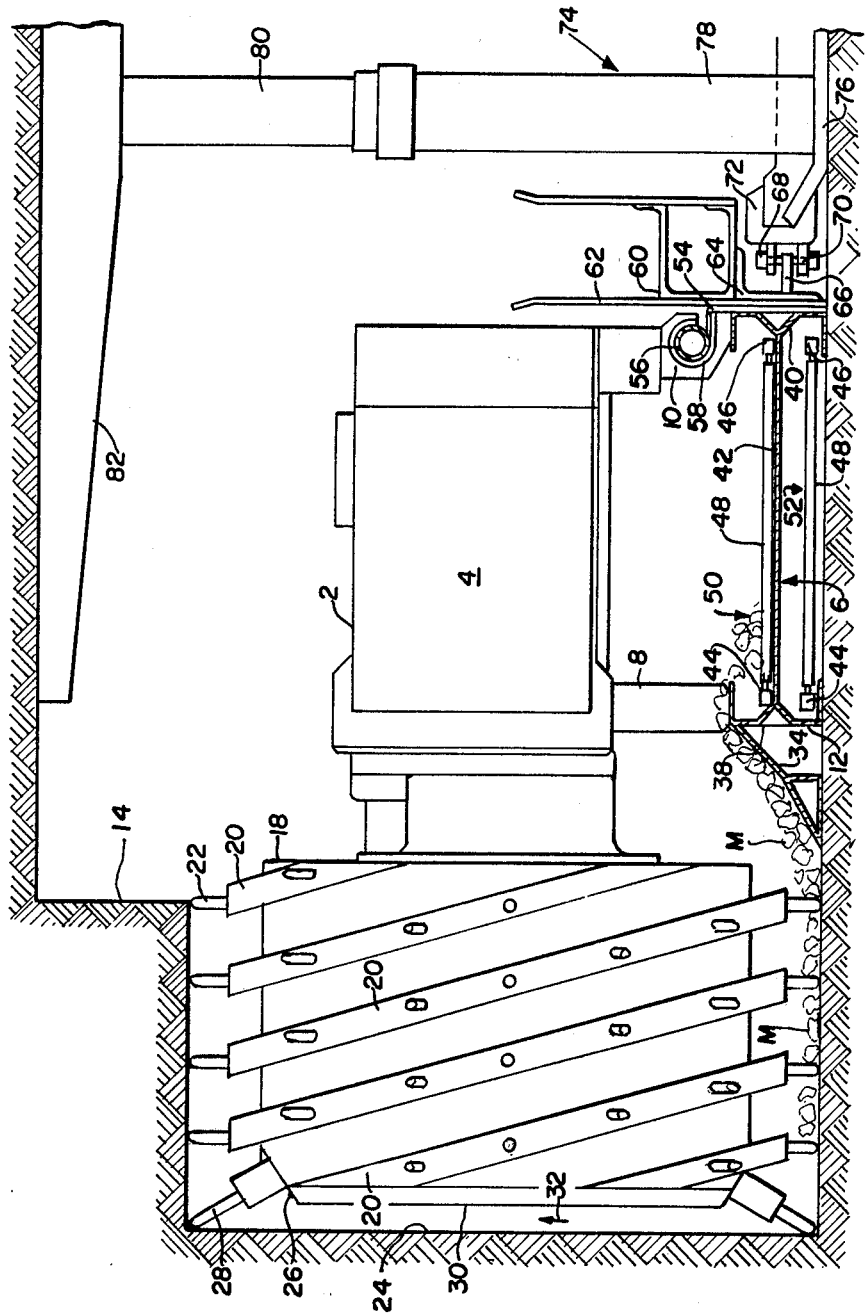

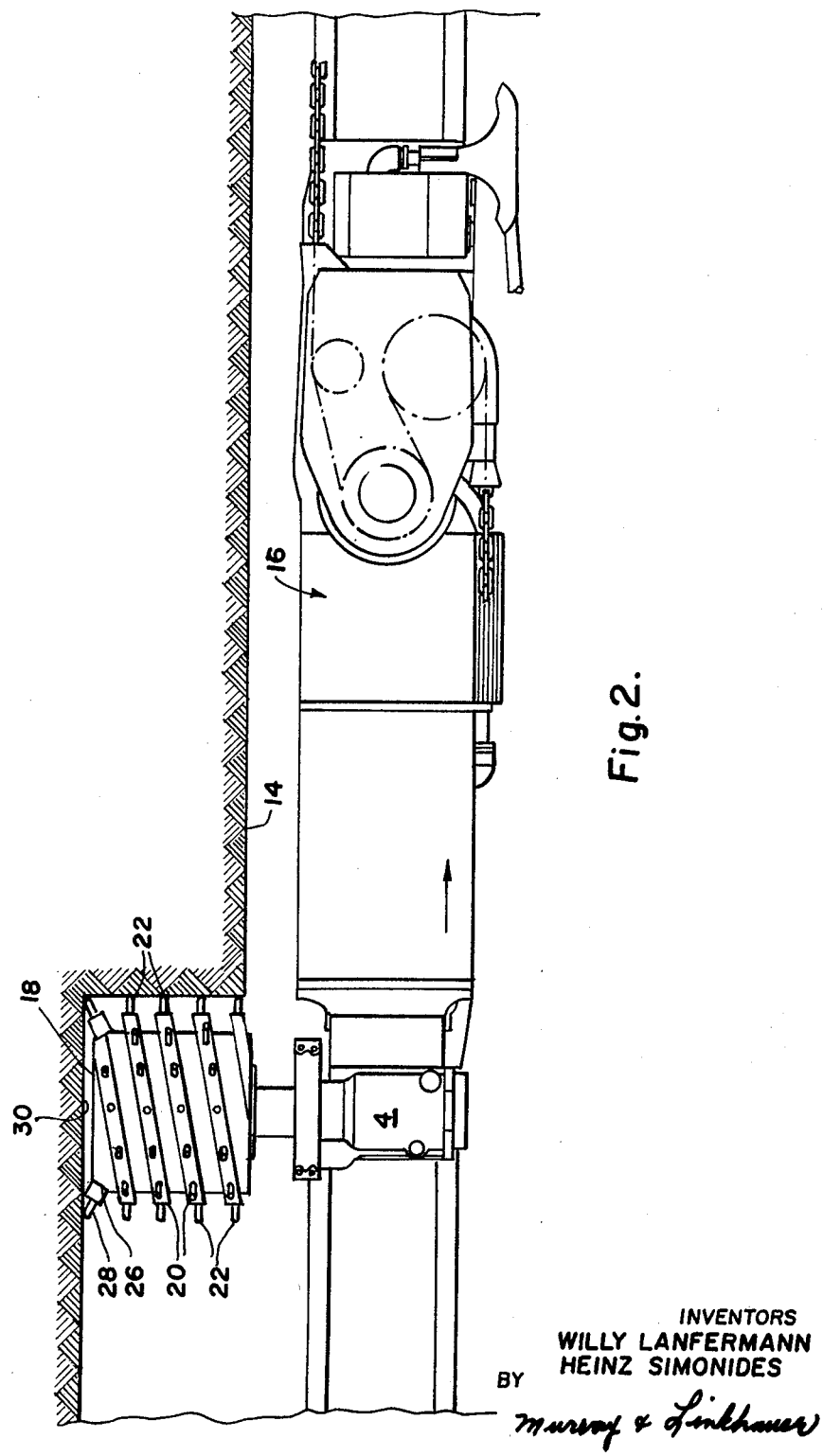

3,473,846
SHEARER-LOADER SUPPORTED AGAINST HORIZONTALLY EXTENDING FORCES
Willy Lanfermann and Heinz Simonides, Bochum, Germany, assignors to Gebr. Eickhoff, Maschinenfabrik und Eisengiesserei m.b.H., Bochum, Germany, a corporation of Germany
Filed Aug. 17, 1967, Ser. No. 661,369
Claims priority, application Germany, Aug. 19, 1966, E 32,319
Int. Cl. E21c 35/20
U.S. Cl. 299—43    1 Claim

ABSTRACT OF THE DISCLOSURE

This patent discloses apparatus for widening a mine passageway that permits props or supports to be placed close to the wall being worked while at the same time the cutter is protected against unwanted movements perpendicularly to the face and against lifting or tilting. This is done by providing a conveyor that runs parallel to the wall being worked and has a frame that has side walls, the one of which on the side more distant from the wall being worked has fixed thereto a guide rail, cutter means that ride on the side walls of the frame and engage the guide rail, and means for moving the cutter means along the guide rail. The cutter head is generally cylindrical and carries, in one or more tool-holder strips running helically thereof, a large number of coal-loosening tools, which act to convey loosened coal away from the face being worked and over a ramp onto the upper run of the conveyor. As the tools are arranged on the side of the generally cylindrical cutter head, the tools nearest the working face are canted at their outer ends toward the working face, so as to leave a substantial distance between the new face being formed and the end of the cylindrical cutter head.

BACKGROUND OF THE INVENTION

Field of the invention

This invention relates to mining machinery, and in particular, to apparatus for longwall mining of coal and other minerals.

Description of the prior art

Longwall mining has been practiced for many decades. A longwall mining installation typically includes a shearer-loader, a conveyor running parallel to the face being worked, and a roof support system. After a passageway of suitable width is cut in the seam, the equipment is introduced and is used to work one of the longwalls of the seam.

Shearer-loaders of various kinds are known. A shearer-loader typically has a base that contains a conveyor, for example, of the chain-and-scraper-rod type, and mounted thereabove, means for mounting and driving one or more drums, generally cylindrical, about the circumference of which there are mounted a number of bits or picks in a scroll, screw, or progressive screw arrangement. The drum or drums loosen coal from the longwall. In certain instances, the helical arrangement of the bits or picks on the drum is sufficient to cause the loosened coal to be forced upwardly over a ramp onto the conveyor of the shearer-loader, by which conveyor the coal or other mineral is then transported to the main conveyor and away from the site of mining. In other instances, other means such as motorized ramps are used to convey the loosened coal to the conveyor of the shearer-loaded. Though satisfactory results may sometimes be obtained with a single drum which is not arranged for movement upward or downward, longwall mining equipment is also known in which the shearer-loader has a drum that may be moved upward or downward to follow the seam or, in the case of thick seams, to cut material that was not loosened on a previous pass. With thick seams, a pair of drums may be used.

Longwall mining equipment also typically includes a roof-support system, which commonly comprises a plurality of props that contain hydraulic jacks, which bear against members that exert pressure against the floor and the roof. After a cut has been made, individual ones of the props are depressurized and moved inward, toward the face being cut, along with the shearer-loader. Shearer-loaders known prior to the present invention have had several drawbacks. They have been of such width that the roof supports are at a substantial distance from the new or old face being cut, with a consequent safety hazard. Support of the cutter against tipping or other undesirable movement has left something to be desired. Machine maneuverability and wear on shoes where the cutter of the shearer-loader rests upon the conveyor frame thereof have also presented problems.

SUMMARY OF THE INVENTION

In accordance with the invention, there is provided a shearer-loader in which there is a guide rail that is affixed to the side wall nearest the props of the frame of the conveyor of the shearer-loader, and the cutter that rides on the frame has a member that grasps the guide rail. It is important that the guide rail be provided on the filling side, i.e., on the side away from the face, to avoid interfering with the movement of the cutter.

BRIEF DESCRIPTION OF THE DRAWINGS

A complete understanding of the invention may be obtained from the foregoing and following description thereof, taken together with the accompanying drawings, in which:

FIGURE 1 is an end elevation view of equipment in accordance with the invention; and FIG. 2 is a plan view of equipment in accordance with the invention.

DESCRIPTION OF THE PREFERRED EMBODIMENT

Referring to FIG. 1, there is shown an end view of a shearer-loader 2 for use in the longwall mining of coal or other minerals. The shearer-loader 2 comprises a cutter portion, generally indicated at 4, and a conveyor portion, generally indicated at 6. The cutter portion 4 has shoes 8 and 10, by means of which it rides on the frame 12 of the conveyor 6 when the cutter portion 4 is drawn along the old face 14 of mineral to be cut, as by means of a haulage unit 16, best seen in FIG. 2. The cutter portion 4 comprises a generally cylindrical drum 18, which is provided with one or more helically running tool-holder strips 20, within which are mounted a number of picks 22. Preferably, but not necessarily, a portion of the drum 18 near the new face 24 is beveled, as at 26, to enable the pick 28 to project substantially beyond the end 30 of the drum 18, but this may be done in other ways, as by the use of a pick 28 of different shape. When the drum 18 is rotated in the direction of arrow 32, the mineral M loosened from the new face 24 will be urged, by the action of the tool-holder strips 20 and picks 22, away from the new face 24 and up a ramp 34 leading to the conveyor portion 6. Those skilled in the art will appreciate that alternative means of gathering the coal onto the conveyor portion 6 might be used, among which might be mentioned the use of a dozer plate or a mobile ramp.

The conveyor portion 6 has a frame 36 which includes a first side wall 38, which is adjacent to the faces 14 and 24 of mineral, and a second side wall 40, on the side of the conveyor away from the faces 14 and 24 of mineral.

Joining the side walls 38 and 40 is an intermediate portion 42. By means of a pair of chains 44 and 46, joined by a number of scraper rods 48, mineral M falling from the ramp 34 onto the intermediate portion 42 may be conveyed in a direction generally parallel to the faces 14 and 24. It will be understood that the chains 44 and 46 are endless, being run about suitable sprockets (not shown), so that the chains 44 and 46, the scraper rods 48, and the intermediate portion 42 thus serve as a conveyor with an operative portion or upper run 50 and a return run 52.

Affixed to the side wall 40 is a plurality of angular holders 54, of which one is seen in FIG. 1. The holders 54 secure a guide rail 56, which constitutes an important part of the present invention. As best seen in FIG. 1, the shoe 10, which comprises a part of the cutter portion 4, is provided with a hollow portion 58, which serves to grasp the guide rail 56. It will be understood that there may be one or more such shoes 10 having hollow portions 58.

Connected to the angular holder 54 is a bracket 60 having arms 62. Bracket 60 serves as a support for the current supply cable, control and communication, water lines, etc. (not shown). Mounted against the bracket 60 is an angle iron 64 having a lug 66, which is joined by means of a bolt 68 to the lugs 70 which project from a part 72 of the roof prop 74. It will be understood that the roof prop 74 shown in FIG. 1 is one of a large number of such props, placed generally parallel to the faces 14 and 24. The props 74 are usually of the self-advancing type and each has a base 76, a lower portion 78, an upper portion 80, and a roof-engaging portion 82, the lower portion 78 containing hydraulic means for exerting pressure on the base 76 and roof-engaging portion 82. Some or all of the roof props 74 contain means for urging the parts 72 toward the faces 14 and 24 so that the conveyor portion 6 of the shearer-loader may be advanced in the vicinity where a cut has been made and the dislodged coal removed. It will be understood that, to this end, the conveyor portion 6 of the shear-loader 2 is preferably made in a plurality of articulated sections, so that after the cutter portion 4 has passed a particular location by an adequate distance, such motion of the conveyor portion inward toward the face 14 will be possible.

It is thus seen that, by the use of the present invention, the distance between the foremost row of roof props and the working face is minimized, and at the same time, a secure guiding of and support for the cutter portion which is moved on the side walls of the conveyor frame is achieved.

While we have shown and described herein certain embodiments of our invention, we intend to cover as well any change or modification therein which may be made without departing from the spirit and scope of the invention.

We claim as our invention:

1. A shearer-loader for use in longwall mining comprising, in combination, a conveyor running substantially parallel to a mineral face worked by said shearer-loader and having a frame with a first side wall adjacent to said mineral face and a second side wall more remote from said mineral face than said first sied wall, a guide rail attached to said second side wall by means of an angular holder that extends inwardly of said conveyor, and a cutter means mounted on said first and second side walls for motion therealong, said cutter means having means for grasping said guide rail comprising a shoe having a hollow portion within which said guide rail is received, said shoe being of such shape as to substantially to surround said guide rail, whereby said shearer-loader is supported against movement transversely with respect to said conveyor by horizontally extending forces, regardless of whether said forces are directed toward or away from said mineral face.

References Cited

UNITED STATES PATENTS 3,356,417   12/1967   Heyer et al. _____ 299—43

FOREIGN PATENTS 1,396,756   3/1965   France.
1,215,631   5/1966   Germany.

ERNEST R. PURSER, Primary Examiner